Patented Apr. 9, 1929.

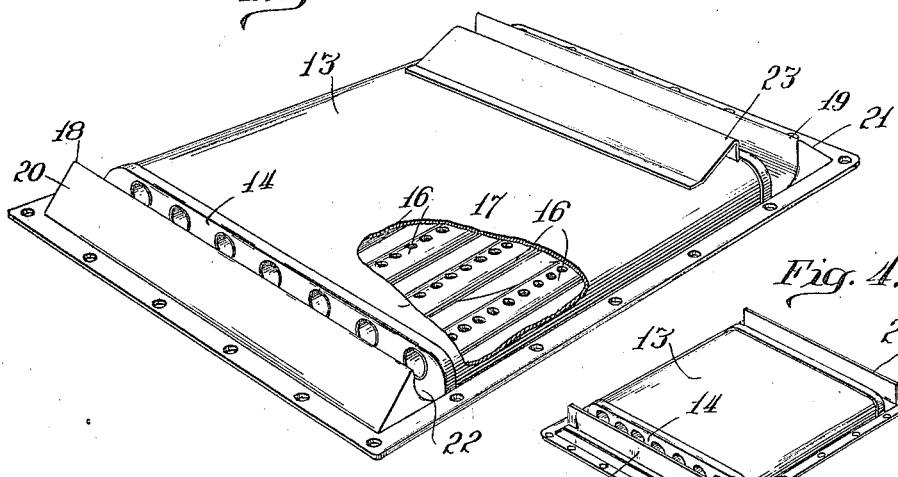
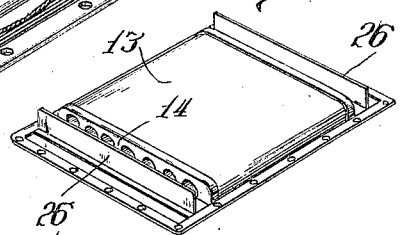
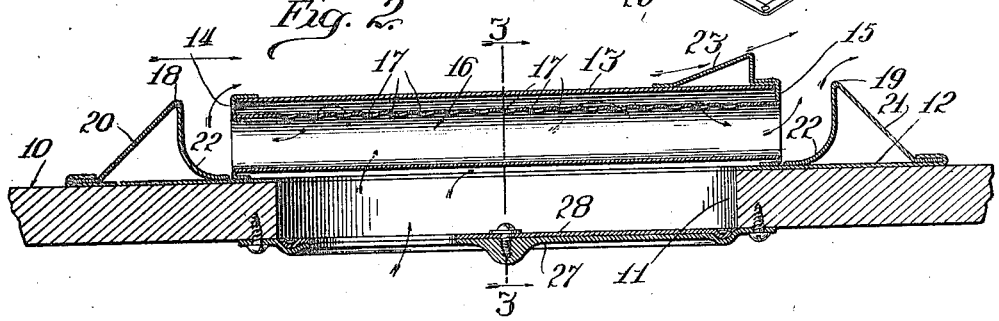
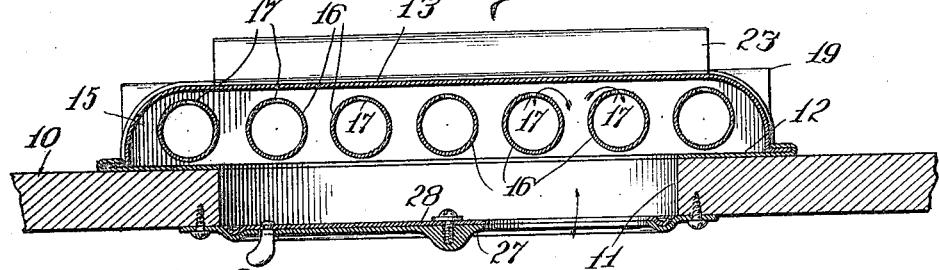
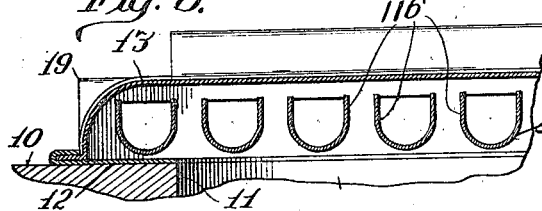

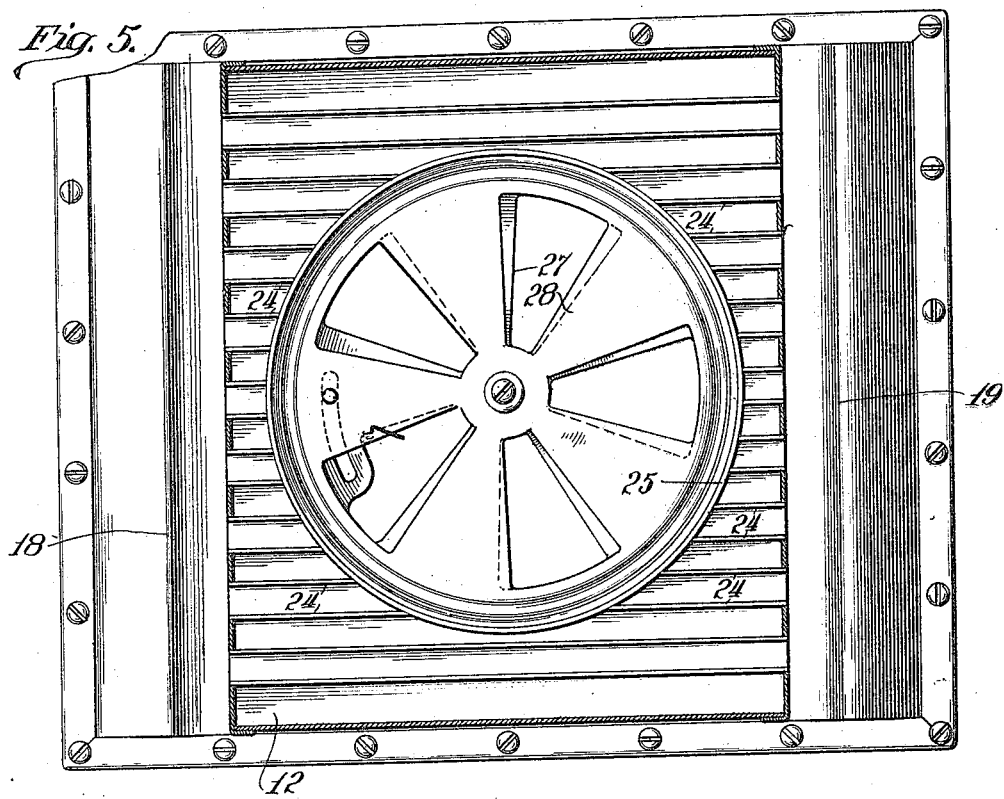
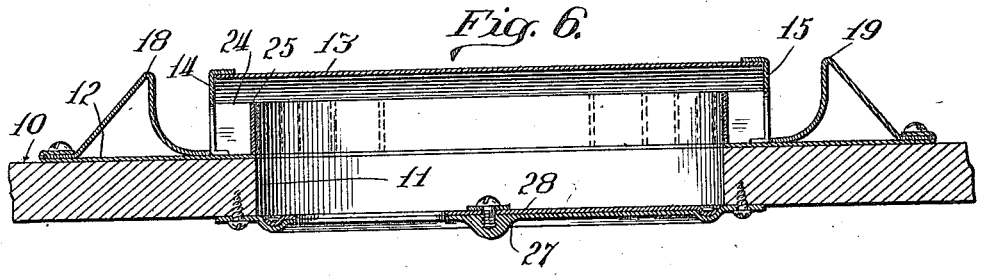
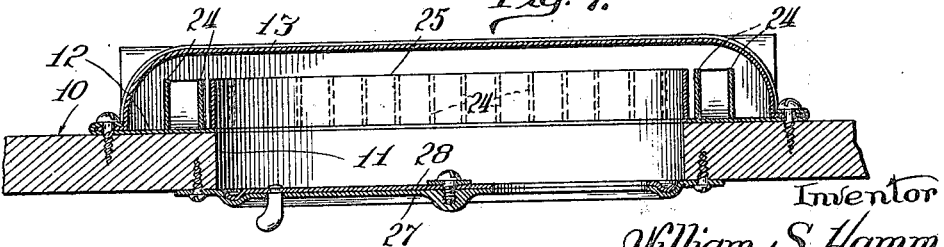

1,708,134

UNITED STATES PATENT OFFICE.

WILLIAM S. HAMM, OF HUBBARD WOODS, ILLINOIS.

VEHICLE VENTILATOR.

Application filed October 26, 1925. Serial No. 64,720.

The invention relates to ventilators for vehicles having closed bodies, such as automobiles of the limousine type; its object being to provide a ventilator of high efficiency which may be attached to the vehicle without being unduly conspicuous, and which will effectually exclude weather from the interior of the vehicle.

The invention consists of a structure substantially as hereinafter described, and as illustrated in the accompanying drawings, in which Fig. 1 is a perspective view of a ventilator detached;

Fig. 2 is a vertical longitudinal central section showing the ventilator applied to the top of a vehicle;

Fig. 3 is a transverse section on the line 3—3 of Fig. 2;

Fig. 4 is a perspective of the ventilator showing a slight modification;

Fig. 5 is a plan section showing a further modification;

Figs. 6 and 7 are respectively a vertical longitudinal and a transverse central section of the same form; and Fig. 8 is a detail vertical transverse section showing a further modification.

The improved ventilator is preferably attached to the top of a vehicle, as shown in Fig. 2, though this location is not essential to its operation.

In the drawings the top wall of a vehicle is conventionally shown at 10, and is provided with an aperture, preferably circular, at 11. The ventilator comprises a base plate 12, having an aperture registering with that of the vehicle wall, and a cover plate 13 spaced apart from the base plate, its side margins being downturned for attachment to the latter, as shown in Fig. 3. The form of attaching joint is immaterial, providing it is weather-tight.

The chamber between the plates 12 and 13 is closed at its ends by plates, as 14, 15, the joints being weather-proof. Within this chamber and opening through the plates 14, 15, are a series of tubes 16, of any preferred number, each of these tubes being freely perforated, as shown at 17, in its upper portion. Preferably a single line of perforations upon the extreme top of the tube is employed, though the size, number and precise location of the perforations are optional. These tubes may be continuous from end to end of the chamber, as shown, though this is not essential.

For the purpose of producing a minus pressure within the tubes 16, and for preventing air currents from entering their ends, abutments 18, 19, are erected on the end portions of the plate 12 and face the open ends of the tubes. These abutments are preferably of substantially the height of the cover plate 13. It is found desirable, although not essential, that beyond each of the abutments, and joining the upper end thereof, there are placed inclined plates 20, 21, which may be attached to the ends of the plate 12 as shown, or to the vehicle top. In Fig. 4 are shown abutments consisting of simple upstanding plates 26, the inclinations being omitted. I deem it advisable, also, to curve the abutments at their lower ends toward the tubes, as shown at 22, as this configuration serves to guide the outflowing air currents and avoids a tendency to an eddying action.

In Fig. 2 the left end of the view is toward the front of the vehicle, and the efficiency of the device is somewhat increased by placing at the rear end of the cover plate 13 an upwardly inclined deflector 23.

In lieu of the tubes there may be employed simple troughs, as shown in Figs. 5 to 8. In the construction of Figs. 5 to 7 these troughs are formed of simple plates or strips 24, arranged in pairs and extending inwardly from the end plates 14, which are apertured between them, and upwardly from the bottom plate, but not reaching the cover plate 13.

The troughs formed by the plates 24, which intersect the central flue passage communicating with the interior of the vehicle, are cut off from this flue, except through their open tops, by any suitable means, as by a continuous wall 25 forming an extension of this flue to the tops of the troughs.

In the construction of Fig. 8, similar troughs are substituted for the tubes 16, and are formed each of a U-shaped strip of metal 116, the openings in the end walls 14 being of course of similar shape and size. When the troughs are provided with bottoms as in the form of Fig. 7, they may, if desired, extend across the central flue opening.

In order that the action of the ventilator may be regulated at the pleasure of the occupants of the vehicle, a damper is placed at the inside of the vehicle wall to close the aperture 11 or open it to any desired extent. This damper may be of any preferred form of construction, and there is shown a simple form of device comprising a fixed apertured plate 27 and a rotatable correspondingly apertured plate 28.

In operation, when wind currents sweep backwardly with reference to the direction of travel of the vehicle, they pass across the trough formed between the abutment 18 and the plate 14 and because of their diminished lateral pressure they induce an outflow of air into this trough from the tubes or internal troughs 16, thereby producing a minus pressure within the tubes which is satisfied by an outflow of air from the interior of the vehicle, as indicated by the arrows in Fig. 2. At the rear end of the device a similar but, at some wind velocities, less pronounced action is set up, and is somewhat accentuated when the deflector 23 is employed, as it checks the tendency of the wind currents to eddy into the trough.

When the vehicle is standing and the wind is from the rear, the abutment 19 prevents it from blowing through the tubes or internal troughs 16, and causes the exhausting action previously described. If the wind is blowing transversely across the vehicle, and at greater velocity than the relative backward movement of the air due to the speed of the vehicle, the device is effective, as the currents passing longitudinally through the troughs enclosed by the abutments will draw the air through the openings in the plates 14.

But for the abutments 18, 19, the wind would blow directly through the tubes 16, when they are continuous, and while there would be an exhausting action set up moisture would, of course, be carried into the tube and the danger that rain or snow might find its way through the perforations 17 and into the vehicle, would be less effectively guarded against.

The device, in any of the several forms shown, effectually prevents the weather from entering the vehicle, even during severe storms, as any moisture which may beat in at the ends of the tubes or internal troughs will not pass out of them through their open tops.

Should there be an accumulation of snow within the troughs enclosed by the abutments, as, for example, when the vehicle is left standing in a snowstorm, the exhausting action set up when the vehicle is moved at even a moderate speed is sufficient to withdraw it and practically clear the troughs.

The inclined plates 20, 21, are preferably employed for the purpose of checking the tendency of the wind to form eddies within the trough. In practice, however, when the construction shown in Fig. 4 is followed, there is apparently a banking up of the air against the forward face of the abutment, which produces a natural incline to deflect the currents upwardly and check the tendency to eddying. I regard the inclined plates 20, 21, as contributing to the efficiency of the device.

Various changes in the details of the structure may be made within the scope of the invention, and, as already pointed out, some of its parts may be omitted. The base plate 12 is not essential to the operation of the device. The deflector 23 may be employed with or omitted from any of the several forms of the device shown.

I claim as my invention:—

1. A ventilator for vehicle bodies comprising a casing open to the body to be ventilated, a tube located horizontally within the casing and opening through a wall thereof, such tube having an opening in its upper side, and a shield facing the open end of the tube.

2. A ventilator for vehicle bodies comprising a casing open to the body to be ventilated, a tube located horizontally within the casing and opening through the end walls thereof, such tube having an opening in its upper side, and shields facing the open ends of the tube.

3. A ventilator for vehicle bodies comprising a casing open to the body to be ventilated, a plurality of tubes located within the casing and opening through one end thereof, such tubes being perforated in their upper sides, and a shield facing the open ends of the tubes.

4. A ventilator for vehicle bodies comprising a casing open to the body to be ventilated, a plurality of horizontal tubes located within the casing and opening through the ends thereof, such tubes being perforated in their upper sides, and shields facing the open ends of the tubes.

5. A ventilator for vehicle bodies comprising a casing open to the body to be ventilated, a plurality of tubes located within the casing and opening through the ends thereof, such tubes having a longitudinally disposed series of apertures in their upper sides, and shields facing and spaced from the open ends of the tubes.

6. A ventilator for vehicle bodies comprising a casing open to the body to be ventilated, a tube located horizontally within the casing and opening through a wall thereof, such tube having an opening in its upper side, and an inclined shield facing the open end of the tube.

7. A ventilator for vehicle bodies comprising a casing open to the body to be ventilated, a tube located horizontally within the casing and opening through the end walls thereof, such tube having an opening in its upper side, and inclined shields facing the open ends of the tube.

8. A ventilator for vehicles comprising a chambered casing having an opening in its bottom for communicating with the interior of the vehicle and having a plurality of openings in each end, a duct leading inwardly from and enclosing each end opening and being upwardly open to the chamber and a shield facing the end openings for preventing the entrance of air currents.

9. A ventilator for vehicle bodies comprising a casing having a flue passage therethrough open externally laterally of the casing and to the interior of the vehicle, the outer portion of the flue being closed at its bottom and sides, and a shield facing and spaced apart from the external opening of the flue.

10. A ventilator for vehicle bodies comprising a casing having a flue passage therethrough open externally, laterally of the casing and to the interior of the vehicle, the outer portion of the flue being subdivided, each subdivision being closed at its bottom and sides, and a shield facing and spaced apart from the several external openings of the flue.

In testimony whereof I affix my signature.

WILLIAM S. HAMM.